United States Patent [19]
Fenster et al.

[11] 3,807,435
[45] Apr. 30, 1974

[54] COMPRESSION SEAL TAPPING SLEEVE

[75] Inventors: Abraham S. Fenster; Fred W. Salloga, both of Chattanooga, Tenn.

[73] Assignee: United States Pipe and Foundry Company, Birmingham, Ala.

[22] Filed: June 5, 1972

[21] Appl. No.: 259,728

[52] U.S. Cl. .............................. 137/317, 285/197
[51] Int. Cl. ...................... B23b 41/08, F16e 41/04
[58] Field of Search ............ 137/317, 318; 285/197, 285/198, 199

[56] References Cited
UNITED STATES PATENTS

| | | | |
|---|---|---|---|
| 2,146,336 | 2/1939 | Frey | 285/197 X |
| 1,181,131 | 5/1916 | Glauber | 285/199 |
| 3,038,490 | 6/1962 | Yocum | 137/318 |

FOREIGN PATENTS OR APPLICATIONS 625,461  8/1961  Canada............................ 285/197

*Primary Examiner*—Alan Cohan
*Assistant Examiner*—David R. Matthews
*Attorney, Agent, or Firm*—James W. Grace

[57] ABSTRACT

A tapping sleeve split along an axis parallel to the longitudinal axis of a pipe main to be tapped and installed around the main in such a manner that tapping is accomplished through a branch opening while the split fitting provides a dual compression seal completely around and immediately adjacent the tapped opening and wherein each split half of the sleeve includes raised serrated pads on the inner surface thereof which are embedded into the pipe main.

3 Claims, 3 Drawing Figures

COMPRESSION SEAL TAPPING SLEEVE

BACKGROUND OF THE INVENTION

The present invention is in the field of tapping fittings wherein a resilient seal, usually rubber, is held compressed against the pipe main and surrounding the area of the tap opening somewhere within the confines of the tapping fitting before, during and after the tapping process.

The prior art can be broken into two basic groups: the first group being tapping fittings wherein a seal is formed around the main pipe to be tapped and near the extremities of the "run" —outer axial boundaries— of the tapping fitting and the other group being wherein a seal is formed around the tapped opening. A preponderance of the recent designs fall in the latter group as does the present invention. One reason for furnishing a tapping sleeve that seals around the tapped opening is that a lighter weight fitting with fewer parts is required. Another is that less skill is required to install such a fitting than is required to install a fitting wherein split gaskets must be placed around the pipe or lead must be poured and caulked around the pipe. However, even in the recent prior art separate sleeves must be furnished to tap pipe of different outside diameters although the pipe are of the same nominal diameter or shims must be furnished to adjust for this change in pipe outside diameter. The present invention requires no shims and furnishes a pressure tight seal on pipe even though the outside diameters are somewhat different.

SUMMARY OF THE INVENTION

The present invention furnishes a lightweight, flexible, split body T shaped fitting that is split along an axis parallel to the longitudinal axis of a pipe to be tapped. One part of the split fitting contains a branch opening with a gasket groove formed on its inside surface in such a position that the groove surrounds the branch opening. Into this groove is fitted a gasket having a main bulb portion and a lip portion. The lip portion furnishes a seal under low pressure and the main bulb portion furnishes a seal under high pressure. The other part of the split fitting is so arranged that it may be bolted to the part containing the branch opening in order to fix the entire fitting to the pipe to be tapped. A further feature of the invention is the provision of diametrically, equally spaced, serrated, raised pads on the inner surface of each portion of the tapping sleeve, the function of which is two fold: 1) they allow flexure of the sleeve halves, made of flexible material such as ductile iron, by providing a fulcrum and thereby allowing the sleeve to different size pipe of the same nominal diameter, and 2) when sufficient force is applied by taking up the bolts which secure each sleeve half to the other, the pads become embedded into the pipe thereby preventing rotation of the sleeve, both axial and rolling around the periphery of the tapped pipe. The T-shaped fitting is split along an axis parallel to the longitudinal axis of the pipe main to be tapped and is installed around the main in such a manner that tapping is accomplished through a branch opening while the split fitting because of its novel design provides a seal around the tapped opening and support for the pipe section, weakened by tapping.

Other novel features will become apparent in the below description of a T-shaped fitting to allow tapping of a pipe main even though the pipe main might be pressurized.

DESCRIPTION OF THE PREFERRED EMBODIMENT

Figure 1:
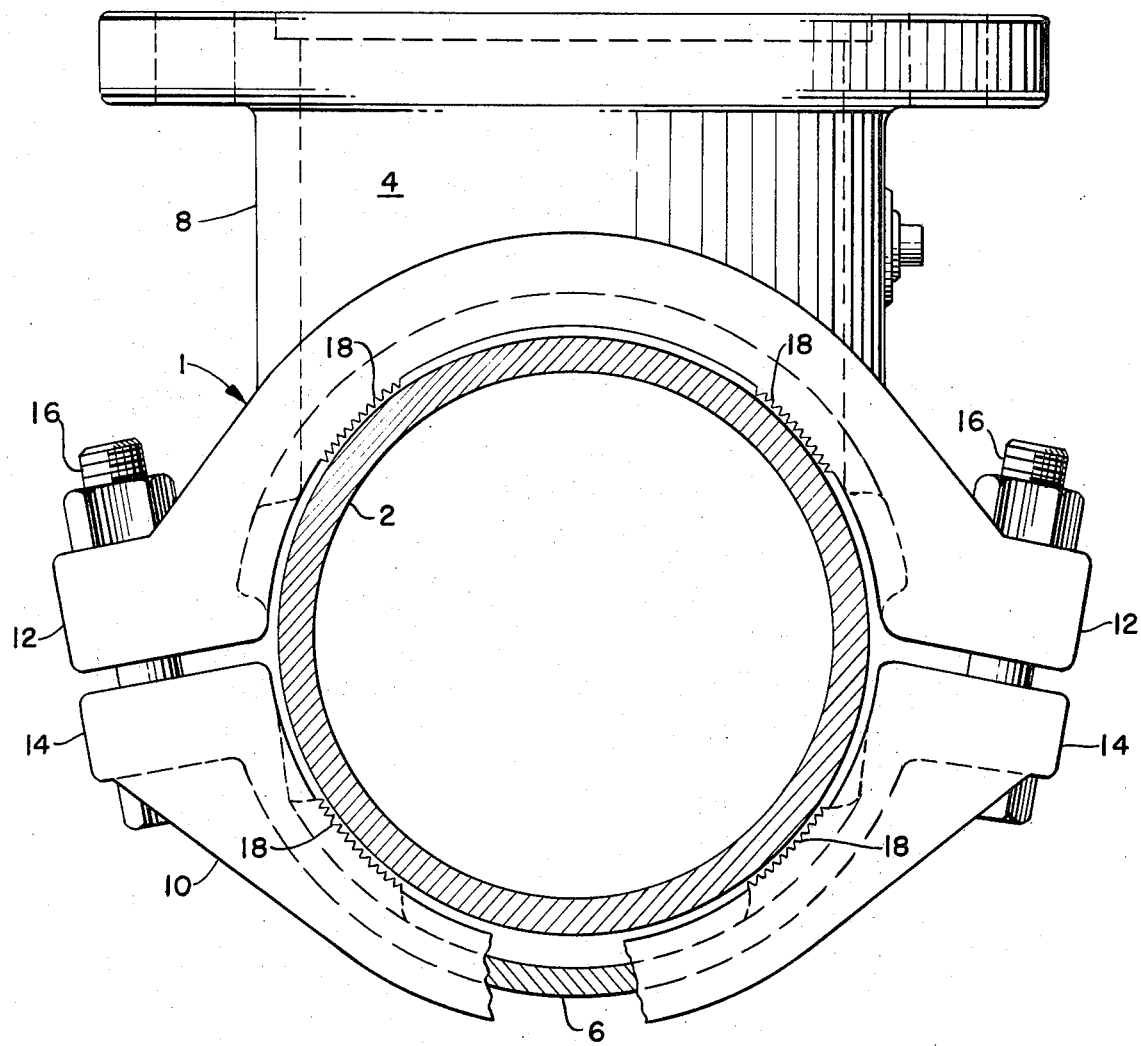
FIG. 1 is an end view of an assembled tapping sleeve in partial cross-sectional view.
Figure 2:
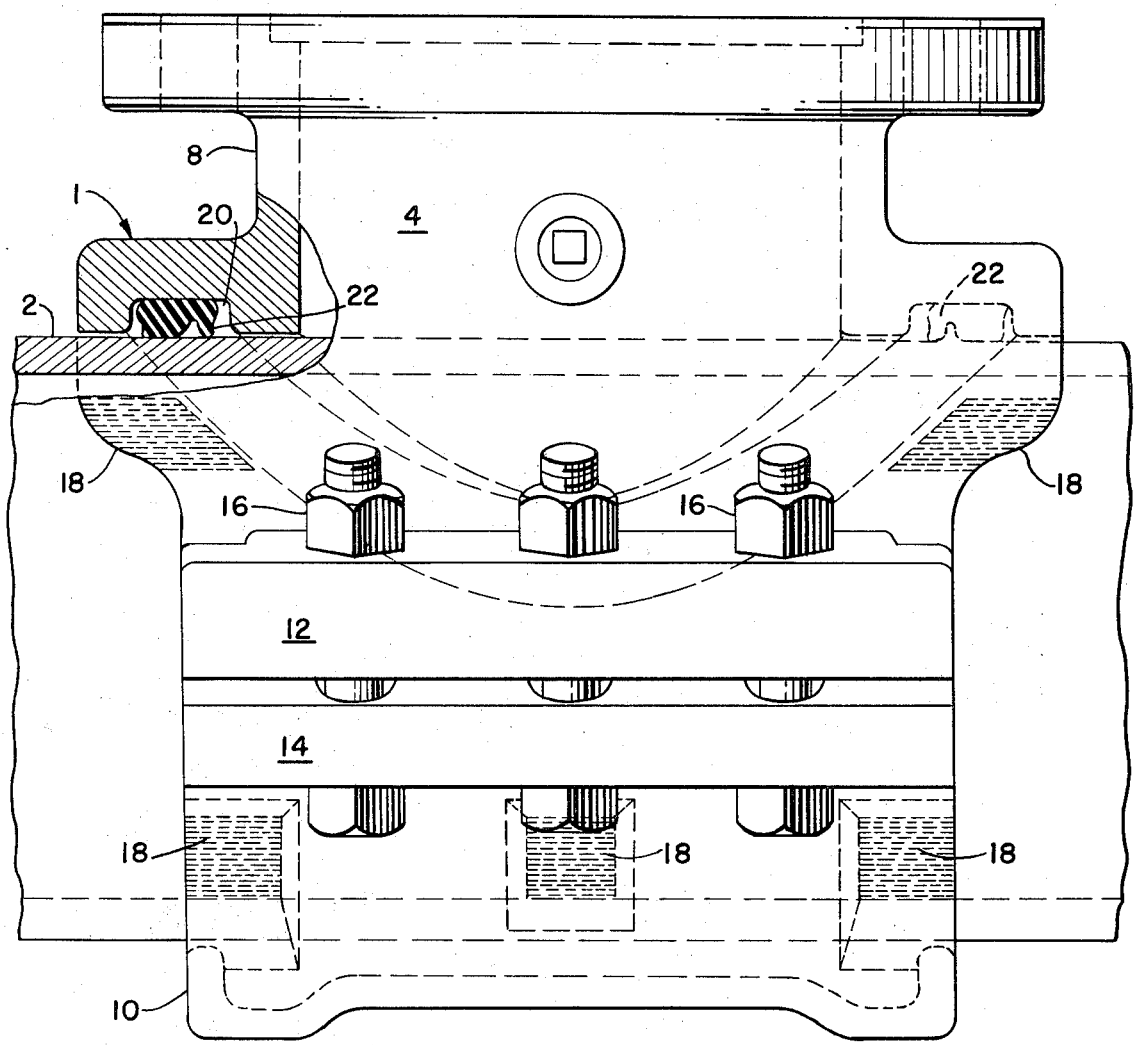
FIG. 2 is a side elevation of a tapping sleeve assembled around a pipe to be tapped.
Figure 3:
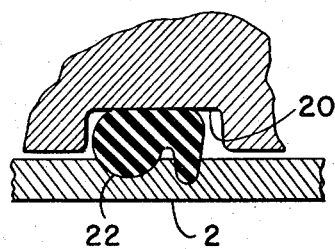
FIG. 3 is a fragmented cross section showing an uncompressed gasket.

Referring to FIG. 1 there is shown an end view of a split tapping sleeve 1, assembled around a pipe 2 with branch opening 4. Tapping sleeve 1 is so designed that its thin walls 6 will have a greater radius than any pipe around which sleeve 1 is to be assembled. As shown the inner surface of each half 8 and 10 is a true radius. It is also within the scope of our invention to make either or both halves eliptical in shape. Also sleeve 1 is so designed that its two parts 8 and 10 are furnished with flanges 12 and 14 along the split edges and that both flanges 12 will not meet both flanges 14 when the desired bolt torque is applied. The reason for this latter feature being that neither part 8 or 10 is a full semicircle in cross section. Sleeve 1 is made of high strength ductile iron which provides walls 6 with the capability of flexing when the force applied by tightening bolts 16 against the resistance of pipe 2 is applied. This novel arrangement offers several improvements over known methods. As bolts 16 are tightened the resistance to deformation of pipe 2 causes serrated pads 18 cast on the inner surface of walls 6 to conform to the diameter of pipe 2 and to grip pipe 2 as well. Thus it is seen that the same sleeve may be used to tap pipe of different outside diameters. There is also furnished in sleeve part 8 a gasket groove 20 surrounding branch opening 4 and into which is placed gasket 22. The groove and gasket are of such arrangement that the gasket will be partially compressed when pads 18 contact pipe 6 and since the gasket is contoured as shown in FIG. 3 the smaller bulb of the gasket contacts pipe 6 first and is compressed to a higher degree than the remainder of the gasket thus affording a good seal even though the liquid pressure against the gasket is very low. It is preferred to have pads 18 equally spaced on the periphery of the pipe and straddled a vertical center line. These pads 18 are spaced along the pipe as shown in FIGS. 1 and 2. Namely, the pads are preferably spaced radially at least 45 arc degress from the ends of each half so as to allow a sufficient amount of flexure of said ends to bring the sleeve into conformity with the pipe surface. Furthermore, it is important that there be at least two pads on each sleeve half which are substantially spaced from and straddle the vertical center line of the sleeve half a substantially equal number of arc degrees, preferably approximately 45 arc degrees. This latter feature provides for the pads being at a point in the sleeve where the nearly maximum amount of force from the tightening of bolts 16 is transmitted through pads 18 to aid in embedding pads 18 into the pipe. As seen in FIGS. 1 and 2, the arrangement of pads 18 is such that part 8 has four pads, and part 10 has six pads. The pads of each sleeve half are spaced about the periphery of the inner surface thereof in sets of two along the longitudinal axis thereof at three equally spaced points, namely, the two ends and the midpoint thereof. The important feature here being that the pressure applied to the pipe surface is substantially equally distributed. One last important feature of the pads is that the total surface area of each pad be substantially equal to the others, and that the total surface area of all pads combined be an insubstantial portion of the total inner surface area of sleeve, for example, on the order of 10 per cent. The serrated surfaces of pads 18 grip the pipe preventing rotation of sleeve 1 about the pipe and support the pipe after it has been weakened by tapping.

While the preferred embodiment of the present invention has been described hereinabove, it is to be understood that other embodiments will also be apparent, therefore it is intended that the invention be limited only as defined in the claims appended hereto.

We claim:

1. A split T pipe fitting comprising a run portion and a branch portion, said run portion being substantially a hollow cylinder with a longitudinal axis, a vertical axis, a horizontal axis, thin walls, two open ends and a side opening, said branch portion being substantially a hollow cylinder with two open ends and one of its open ends intersecting said run portion perpendicularly midway between said open ends and centrally located about said vertical axis of said run portion surrounding said side opening of said run portion and being attached thereto, the other of two said ends of said branch portion comprising means for attaching tapping equipment to said split T, and said run portion being split into a first and second part parallel to said longitudinal axis, both first and second parts having two flanged longitudinal edges, said longitudinal edges having means for bolting said first part to said second part, said first part having said branch portion attached, and said split T having serrated pads depending inwardly from said thin walls, some of said serrated pads being located midway between said vertical and said horizontal axes and at least one of said serrated pads being located along said vertical axis and on said thin wall opposite said branch portion.

2. A split T pipe fitting as recited in claim 1 in which said split T has at least 10 serrated pads depending inwardly from said thin walls, four of said serrated pads being located on each hollow end of said run portion and midway between said vertical and said horizontal axes and two of said serrated pads being located along said vertical axis and on said thin wall opposite said branch portion.

3. A split T pipe fitting as recited in claim 1 in which said first part has a gasket groove inside said run portion and surrounds said side opening, said gasket groove containing a substantial ring-shaped gasket, said gasket having a lip portion connected to a body portion.

* * * * *